United States Patent [19]

Ishikawa et al.

[11] Patent Number: 4,551,031
[45] Date of Patent: Nov. 5, 1985

[54] ELECTRONIC CLINICAL THERMOMETER

[75] Inventors: Takehiro Ishikawa; Akira Yamazawa; Yasuo Kusumoto, all of Tokyo, Japan

[73] Assignee: Kabushiki Kaisha Daini Seikosha, Tokyo, Japan

[21] Appl. No.: 498,130

[22] Filed: May 25, 1983

[30] Foreign Application Priority Data

May 27, 1982 [JP] Japan .................. 57-90283

[51] Int. Cl.[4] .................. G01K 11/22; H03B 25/00
[52] U.S. Cl. .................. 374/117; 128/736; 340/146.2; 374/170; 377/25
[58] Field of Search .................. 374/117, 170, 171; 377/25; 128/736; 340/146.2

[56] References Cited

U.S. PATENT DOCUMENTS

| | | | |
|---|---|---|---|
| 3,862,573 | 1/1975 | Mori et al. | 374/117 |
| 4,015,208 | 3/1977 | Hammer et al. | 377/25 |
| 4,039,969 | 8/1977 | Martin | 374/117 |
| 4,140,999 | 2/1979 | Conway | 374/117 X |
| 4,161,880 | 7/1979 | Prosky | 374/171 |
| 4,249,418 | 2/1981 | Ebata | 374/117 |
| 4,423,968 | 1/1984 | Nemcek, Sr. et al. | 374/170 |

Primary Examiner—Daniel M. Yasich
Attorney, Agent, or Firm—Robert E. Burns; Emmanuel J. Lobato; Bruce L. Adams

[57] ABSTRACT

An electronic clinical thermometer has a first oscillator producing a first temperature oscillating output signal, a second oscillator producing a second temperature oscillating output signal whose frequency is dependent on a measured temperature body temperature, a first counter and a second counter and operative to provide a gate signal after a predetermined number count. A first memory temporarily stores the count content of the first counter in response to the gate signal, and a second memory stores the count content of the first memory. A digital magnitude comparator compares the count content of the first and second memories and produces a corresponding comparison signal indicative of whether the count content of the first memory is greater or not greater than the count content of the second memory. A flip-flop circuit responds to the comparison signal to produce a control signal for controlling a switching circuit in dependence on the comparison signal so as to selectively switch either the count content of the first memory or the count content of the second memory, whichever is greater, to a decoder ROM which decodes the count content and applies decoded digital signals to a driving circuit for driving a display. The display always shows the maximum value of the measured bodily temperature and thus provides error-free temperature measurements.

15 Claims, 4 Drawing Figures

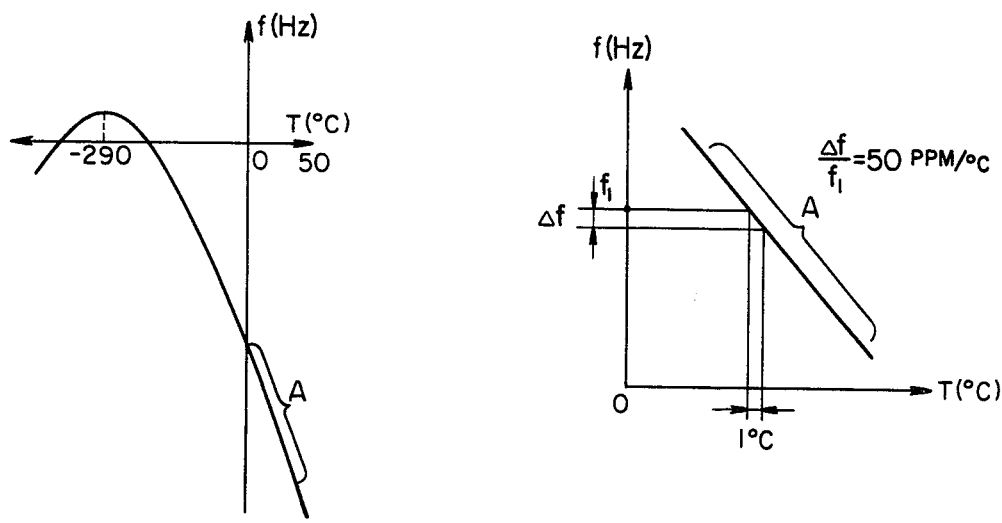
FIG. 1
FIG. 2
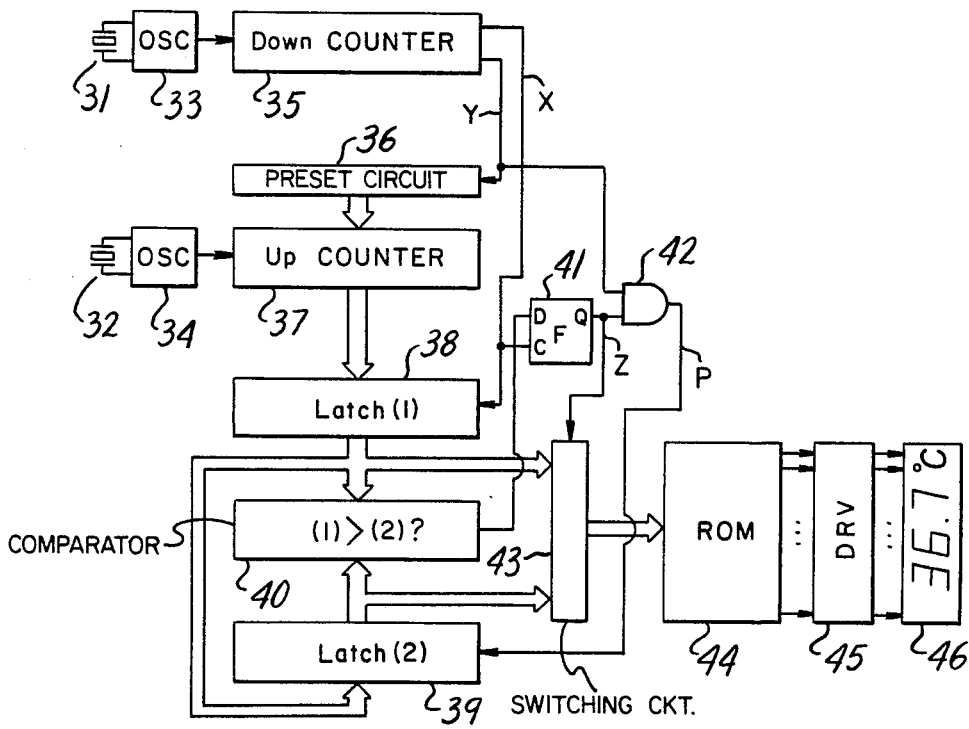
FIG. 3

4,551,031

ELECTRONIC CLINICAL THERMOMETER

BACKGROUND OF THE INVENTION

The present invention relates to a measuring circuit of an electronic clinical thermometer which utilizes a temperature characteristic of the quartz vibrator.

It is well known that the oscillating frequency of a quartz vibrator changes with a change in temperature, and a so-called electronic clinical thermometer has been proposed which has a first oscillator whose oscillating frequency is relatively stable over a wide temperature range, a second oscillator whose oscillating frequency is largely changeable according to a temperature change, means for dividing in frequency the output signal of the first or second oscillator to obtain a gate pulse signal, and a frequency counter which counts the oscillating frequency of the other oscillator by the use of the gate pulse signal.

An object of the present invention is to provide an electronic clinical thermometer which is able to hold the maximum body temperature as well as the conventional mercury clinical thermometer.

The present invention will be described in more detail in conjunction with the drawings.

FIG. 1 is a graph illustrating the relationship between an oscillating frequency and the temperature of the quartz vibrator used as a temperature sensor. In the manufacturing process of a quartz vibrator, when the vibrator is cut with a predetermined angle, it is possible to theoretically obtain a quartz vibrator having a turning point of −290° C. approximately. When the vibrator is used between 0° C. and 50° C., the end portion of a second degree curve indicating the temperature characteristic has the characteristic that large changes in frequency will be caused by small changes in temperature (shown by the curve section A in FIG. 1).

The principle of the measurement of an electronic clinical thermometer is that the large change in frequency is applied to a thermosensor, and FIG. 2 is an enlarged figure of the curve section A of FIG. 1. In FIG. 2, the rate of the frequency change is approximately 50 PPM/°C.

BRIEF DESCRIPTION OF THE DRAWINGS

FIG. 1 is a view illustrating a frequency temperature characteristic curve of a quartz vibrator which is used as a thermosensor;

FIG. 2 is an enlarged view of part of the curve of FIG. 1;

FIG. 3 is a circuit diagram of a circuit of the present invention; and

FIG. 3 is a circuit diagram according to the present invention. The circuit comprises a quartz vibrator with 31 used for a temperature sensor, a standard quartz vibrator 32, oscillating circuits 33 and 34, down-counted 35, 36 a preset circuit, an up-counter 37, a first latch circuit 38, a second latch circuit 39, a magnitude comparator 40, a D type flip-flop 41 (will be referred to as D-F/F hereinafter), an AND circuit 42, a switching-over circuit 43, a decoder ROM 44, a driving circuit 45 and an indicator 46.

Figure 4:
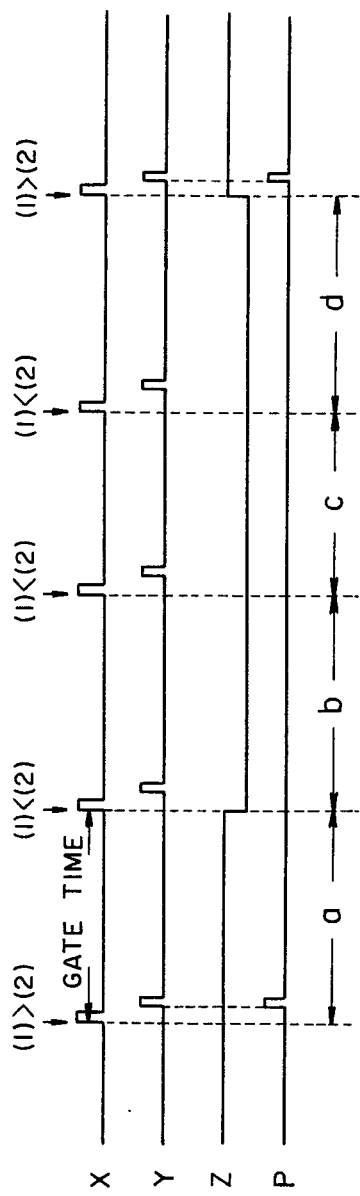
FIG. 4 is a timing chart for explanation of the operation of the circuit of FIG. 3.

The oscillating output of the oscillating circuit 33 is applied to the input terminal signal of the down-counter 35, a signal Y which is the output signal of the down-counter 35 is applied to one input terminal of the AND circuit 42 and to a control input terminal of the preset circuit 36, and a gate signal X is applied to each clock input terminal of the first latch circuit 38 and the D-F/F 41.

The oscillating output signal of the oscillating circuit 34 is applied to the clock input terminal of the up-counter 37, the output signal of the preset circuit 36 is applied to the preset input terminal of the up-counter 37, and the output signal of the up-counter 37 is applied to the input terminal of the first latch circuit 38. The output signal of the first latch circuit 38 is applied to the input terminal of the second latch circuit 39, to one input terminal of the magnitude comparator 40 and to one input terminal of the switching-over circuit 43. The output signal of the second latch circuit 39 is applied to the other input terminal of the magnitude comparator 40 and to the other input terminal of the switching-over circuit. The output signal of the magnitude comparator 40 is applied to the input terminal of the D-F/F 41, and the output control signal 2 of the D-F/F is applied to the control input terminal of the switching-over circuit 43 and to the other input terminal of the AND circuit 42. The output of the AND circuit 42 is connected to the clock input terminal of the second latch circuit 39. The output of the switching-over circuit 43 is connected to the input terminal of the decoder ROM 44, the output of the decoder ROM 44 is connected to the input terminal of the driving circuit 45, and the output of the driving circuit 45 is connected to the indicator 46.

The magnitude comparator 40 is a circuit for comparing the count contents of the first latch circuit 38 with that of the second latch circuit 39 (in this case, discriminating which count content is larger) and producing a corresponding comparison signal. In the figure, it is displayed by "(1)>(2)?". This means that the output level of the comparison signal of the magnitude comparator 40 becomes "1" when the count content of the first latch circuit 38 is larger than that of the second latch circuit 39.

Next, an explanation will be given of the mode of operation of the circuit.

The gate signals X and Y are produced from the down-counter 35 with the relative timings shown in FIG. 4, and the periods thereof will be referred to as the gate time. The principle of the measuring of the bodily temperature is based of the fact that the number of periods or oscillations of the oscillating output signal of the oscillating circuit 34 is counted during the gate time which changes in response to the bodily temperature and the counted result (that is, the count content of the up-counter 37) is decoded and displayed in the form of a digital temperature reading. Consequently, the gate time is shortened when the measuring temperature is low, so that the counted result of the up-counter 37 becomes smaller. This is the reason why a negative temperature coefficient quartz vibrator is employed as the quartz vibrator 31.

On the other hand, when the measurement temperature is higher, the gate time is elongated, so that the counted result of the up-counter 37 becomes larger.

In operation, the first latch circuit or memory 38 is rendered operative in response to the signal X. Thus, the measuring result is latched every period. The second latch circuit 39 is rendered operative in response to the output signal from the AND circuit 42 and the maximum value thereof is latched. This will be described in conjunction with FIG. 4. The counted result obtained during the gate time a of FIG. 4 is read in at the time of rising edge of the the second pulse of the gate signal X. That is, at the time of rising edge of the second pulse of the gate signal X, the first latch circuit 38 latches the counted value. At this time, the second latch circuit 39 latches the counted value obtained during the former gate time just before the gate time a the latched value does not change until the time slot is changed from gate time a to gate time b. At the time the time slot is changed from gate time a to gate time b, the output data of the magnitude comparator 40 is read into the D-F/F 41. The magnitude comparator 40 always carries out the comparing operation for comparing the content of the first latch circuit 38 with that of the second latch circuit 39. For example, when $(1)<(2)$, that is, the count content of the second latch circuit 39 is larger than that of the first latch circuit 38, the output level of the D-F/F 41 becomes "0", and the signal P of FIG. 4 is not produced. In such a case, the switching-over circuit 43 selects the count content of the second latch circuit 39 for feeding to the ROM 44.

The operation has been described for the case that the up-to-date measuring value is smaller than the former measuring value and the maximum measuring value of the bodily temperature is indicated.

The count content of the up-counter 37 counted during the gate time c of FIG. 4 is latched by the first latch circuit 38 within the gate time d. When the counted result is larger than the count content of the second latch circuit 39 (maximum bodily temperature), the pulse of the signal P is produced again and the count content of the first latch circuit 38 is read into the second latch circuit 39. That is, when the up-to-date measurement value is larger than the former maximum bodily temperature, the up-to-date data is read into the second latch circuit 39.

As described above, the quartz vibrator 31 detects the bodily temperature from a human being so that the down-counter 35 produces pulse signals X and Y as shown in FIG. 4 and the gate time as shown in FIG. 4 changes in response to the detected bodily temperature. At the same time, the quartz vibrator 32 detects the room temperature and is not affected by the bodily temperature.

The count content of the up-counter 37 is stored in the first latch circuit 38 and the count content of the second latch circuit 39 is zero at the initial state. After the digital type amplitude comparator 40 compares the count content of the first latch circuit 38 with that of second latch circuit 39, the count content of the first latch circuit 38 is decoded and converted to digital values representative of the bodily temperature by the decoder ROM 44 so that the indicator 46 displays the bodily temperature in digital form.

The count content of the second latch circuit 39 is renewed to be the count content of the first latch circuit 38 only when the amplitude comparator 40 judges that the count content of the second latch circuit 39 is not greater than that of the first latch circuit 38. On the other hand, the count content of the second latch circuit 39 is not renewed to be the count content of the first latch circuit 38 when the amplitude comparator 40 judges that the count content of the second latch circuit 39 is greater than that of the first latch circuit 38.

The decoder ROM 44 decodes the maximum content value selected from the count contents of the first and second latch circuits 38 and 39 and applies the decoded data to the driving cicuit 45 which produces corresponding drive signals to accordingly drive the indicator 46. In this manner, the indicator 46 always displays the maximum measurement value of the bodily temperature measured by the electronic clinical thermometer.

As described above, according to the present invention, the maximum bodily temperature is always held and indicated automatically. Therefore, a more convenient and practical electronic clinical thermometer can be provided for consumers and the measurement errors can be completely eliminated.

In addition, the hold function is cancelled when the electronic clinical thermometer is turned OFF, so that the former measuring result is not retained thereby placing the thermometer in readiness for subsequent use.

We claim:

1. An electronic clinical thermometer comprising in combination: a first oscillator having a first temperature coefficient and operable to produce a first oscillating output signal; a first counter connected to receive the first oscillating output signal from said first oscillator; a second oscillator having a second temperature coefficient which differs widely from said first temperature coefficient and operable to produce a second oscillating output signal; a second counter connected to receive the second oscillating output signal from said second oscillator for producing a gate signal; a first memory connected to said first counter for temporarily storing the content of said first counter in response to said gate signal; a second memory connected to said first memory for storing the content of said first memory; a digital magnitude comparator for comparing the content of said first memory with the content of said second memory; means for effecting the transfer of the content of said first memory to said second memory when said comparator judges that the content of said first memory is greater than that of said second memory; switching circuit means for receiving the content of said first memory and the content of said second memory and for selectively producing as an output the content of said first memory when the content of said first memory is greater than that of said second memory, and the content of said second memory when the content of said second memory is greater than that of said first memory; a ROM connected to receive the output of said switching circuit means; a driving circuit connected to the ROM; and indicating means connected to the driving circuit for visually indicating a maximum measurement value.

2. An electronic clinical thermometer as claimed in claim 1; wherein said first counter is connected to a preset circuit enabled by an output of said first counter.

3. An electronic clinical thermometer as claimed in claim 1; wherein each of said first and second oscillators includes a quartz vibrator.

4. An electronic clinical thermometer as claimed in claim 1; further comprising a flip-flop connected between said comparator and said switching circuit means for controlling said switching circuit means.

5. An electronic clinical thermometer as claimed in claim 4; further comprising gate means connected between said flip-flop and said second memory.

6. An electronic clinical thermometer for measuring a bodily temperature and displaying in digital form the maximum value of the measured bodily temperature comprising: a first oscillator having a first temperature coefficient for producing a first oscillating output signal; a second oscillator having a second temperature coefficient which differs widely from said first temperature coefficient and which varies with temperature for producing a second oscillating output signal whose frequency of oscillation varies according to a bodily temperature to be measured; a first counter connected to receive and count the oscillations of the first oscillating output signal; a second counter connected to receive and count the oscillations of the second oscillating output signal and operative to produce a gate signal after a predetermined number count; first memory means for temporarily storing the count content of the first counter in response to the gate signal; second memory means for storing the count content of the first memory means; circuit means for comparing the count content of the first memory with the count content of the second memory and operative to select the greater of the two compared count contents and operative to transfer the count content of the first memory to the second memory when the comparison shows the first memory count content to be greater than the second memory count content; decoding/driving means for decoding the count content selected by the circuit means and producing drive signals representative of the maximum measured bodily temperature; and display means responsive to the drive signals for displaying in digital form the maximum value of the measured bodily temperature.

7. An electronic clinical thermometer according to claim 6; wherein the circuit means comprises switching means connected to receive the count contents of both the first and second memories and operative in response to a control signal applied thereto to select either the count content of the first memory or the count content of the second memory, and means for producing a control signal to control the operation of the switching means in accordance with the comparison of the count contents of the first and second memories.

8. An electronic clinical thermometer according to claim 7; wherein the means for producing a control signal comprises a comparator for comparing the count content of the first memory with the count content of the second memory and producing a corresponding comparison signal, and a flip-flop circuit responsive to the comparison signal for producing the control signal.

9. An electronic clinical thermometer according to claim 8; wherein the flip-flop circuit has a clock input terminal receptive of the gate signal produced by the second counter, another input terminal receptive of the comparison signal produced by the comparator, and an output terminal for producing the control signal.

10. An electronic clinical thermometer according to claim 8; wherein the circuit means includes gate means connected between the flip-flop circuit and the second memory means.

11. An electronic clinical thermometer according to claim 6; wherein the first and second oscillators each includes a quartz vibrator.

12. An electronic clinical thermometer according to claim 11; wherein the circuit means comprises switching means connected to receive the count contents of both the first and second memories and operative in response to a control signal applied thereto to select either the count content of the first memory or the count content of the second memory, and means for producing a control signal to control the operation of the switching means in accordance with the comparison of the count contents of the first and second memories.

13. An electronic clinical thermometer according to claim 12; wherein the means for producing a control signal comprises a comparator for comparing the count content of the first memory with the count content of the second memory and producing a corresponding comparison signal, and a flip-flop circuit responsive to the comparison signal for producing the control signal.

14. An electronic clinical thermometer according to claim 13; wherein the flip-flop circuit has a clock input terminal receptive of the gate signal produced by the second counter, another input terminal receptive of the comparison signal produced by the comparator, and an output terminal for producing the control signal.

15. An electronic clinical thermometer according to claim 13; wherein the circuit means includes gate means connected between the flip-flop circuit and the second memory means.

* * * * *